(12) United States Patent
Ivosev

(10) Patent No.: US 11,474,087 B2
(45) Date of Patent: Oct. 18, 2022

(54) AUTOMATED EXPECTED RETENTION TIME AND OPTIMAL EXPECTED RETENTION TIME WINDOW DETECTION

(71) Applicant: DH TECHNOLOGIES DEVELOPMENT PTE. LTD., Singapore (SG)

(72) Inventor: Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 643 days.

(21) Appl. No.: 16/471,654

(22) PCT Filed: Dec. 1, 2017

(86) PCT No.: PCT/IB2017/057560
§ 371 (c)(1),
(2) Date: Jun. 20, 2019

(87) PCT Pub. No.: WO2018/116039
PCT Pub. Date: Jun. 28, 2018

(65) Prior Publication Data
US 2020/0096489 A1 Mar. 26, 2020

Related U.S. Application Data

(60) Provisional application No. 62/436,633, filed on Dec. 20, 2016.

(51) Int. Cl.
*G01N 30/86* (2006.01)
*G01N 30/72* (2006.01)
(52) U.S. Cl.
CPC ......... *G01N 30/8679* (2013.01); *G01N 30/72* (2013.01); *G01N 30/8644* (2013.01)

(58) Field of Classification Search
None
See application file for complete search history.

(56) References Cited

U.S. PATENT DOCUMENTS

| 6,444,979 | B1 * | 9/2002 | Watanabe | .......... G01N 30/8675 250/281 |
| 2010/0187414 | A1 | 7/2010 | Gorenstein et al. | |

(Continued)

FOREIGN PATENT DOCUMENTS

WO 2016125060 A1 8/2016

OTHER PUBLICATIONS

International Search Report and Written Opinion for PCT/IB2017/057560, dated Apr. 6, 2018.

(Continued)

*Primary Examiner* — Arleen M Vazquez
*Assistant Examiner* — Terence E Stifter, Jr.
(74) *Attorney, Agent, or Firm* — Kasha Law LLC; John R. Kasha; Kelly L. Kasha

(57) ABSTRACT

Systems and methods are disclosed for identifying actual XIC peaks of compounds of interest from samples so that more accurate expected retention times and more accurate expected retention time windows can be calculated. In one system, an actual XIC peak is identified using standard samples. The ratio of the quantity of the compound of interest in any two different samples is known, so this ratios is compared to the intensities of the XIC peak calculated in the two samples to identify an actual XIC peak. In another system, an actual XIC peak is identified using information about other compounds of interest in a plurality of samples. It is known that the XIC peaks of compounds of interest in the same samples have a similar distribution of retention (Continued)

times across those samples, so the distributions of retention times of XIC peaks are compared to identify actual XIC peaks.

6 Claims, 7 Drawing Sheets

(56) References Cited

U.S. PATENT DOCUMENTS

| | | |
|---|---|---|
| 2011/0042561 A1 | 2/2011 | Miller et al. |
| 2013/0080073 A1* | 3/2013 | de Corral ............ H01J 49/0036 |
| | | 702/23 |
| 2014/0156203 A1* | 6/2014 | Yamaguchi ........ G01N 30/8655 |
| | | 702/23 |
| 2016/0054264 A1* | 2/2016 | Carver ................. G01N 27/622 |
| | | 250/282 |
| 2016/0231295 A1* | 8/2016 | Tate ...................... H01J 49/004 |
| 2019/0086372 A1* | 3/2019 | Sakamoto .............. G01N 30/72 |

OTHER PUBLICATIONS

Frederiksson et al. "An Automatic Peak Finding Method for LC-MS Data Using Gaussian Second Derivative Filtering," Journal of Separation Science, 2009, vol. 32, No. 22, pp. 3906-3918, Abstract, and pp. 391-3918.

\* cited by examiner

AUTOMATED EXPECTED RETENTION TIME AND OPTIMAL EXPECTED RETENTION TIME WINDOW DETECTION

CROSS REFERENCE TO RELATED APPLICATION

This application claims the benefit of U.S. Provisional Patent Application Ser. No. 62/436,633, filed Dec. 20, 2016, the content of which is incorporated by reference herein in its entirety.

INTRODUCTION

The teachings herein relate to determining the expected retention time and the optimal retention time window of the chromatographic peak for a compound of interest from standard samples or from monitoring a large number of other compounds of interest in addition to the compound of interest in a large number of samples. More particularly the teachings herein relate to systems and methods for automatically identifying the actual chromatographic peak of the compound of interest from standard samples or from monitoring a large number of other compounds of interest in addition to the compound of interest in a large number of samples. Once the actual chromatographic peak of the compound of interest is found, the expected retention time and the optimal retention time window can be computed.

LC-MS and LC-MS/MS Background

Mass spectrometry (MS) is an analytical technique for detection and quantification of chemical compounds based on the analysis of mass-to-charge ratios (m/z) of ions formed from those compounds. The combination of mass spectrometry (MS) and liquid chromatography (LC) is an important analytical tool for identification and quantification of compounds within a mixture. Generally, in liquid chromatography, a fluid sample under analysis is passed through a column filled with a solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis to generate an extracted ion chromatogram (XIC), which can depict detected ion intensity (a measure of the number of detected ions, total ion intensity or of one or more particular analytes) as a function of retention time.

In some cases, the LC effluents can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. For example, the selected precursor ions can be fragmented (e.g., via collision induced dissociation), and the fragmented ions (product ions) can be analyzed via a subsequent stage of mass spectrometry.

There are often multiple peaks present in an XIC. In conventional methods, a peak in the XIC that is closest to an expected retention time for a compound of interest, or simply a peak exhibiting the highest intensity within the expected retention time, is selected as the peak corresponding to the compound of interest. A compound of interest can also be called an analyte of interest. This selection process, however, may be cumbersome, as it requires that the user specify the expected retention time for each compound of interest. Moreover, it can in some cases result in misidentification of the peak corresponding to the compound of interest.

Accordingly, there is a need for enhanced systems and methods for performing LC-MS or LC-MS/MS, and more particularly for such methods and systems that allow for a more robust, accurate, and automatic selection of a retention time window associated with a compound of interest.

Accurate retention time detection for compounds of interest in XIC quantitation would improve the first pass correct integration rate and support peak review or flagging of uncertain cases. Currently, detection of the wrong retention time is one of the major reasons peak areas are reported incorrectly. Incorrectly reported peak areas require substantial amounts of time and some domain skill for review and correction.

In addition, in, for example, scheduled multiple reaction monitoring (sMRM) experiments, a large number of compounds of interest can be monitored across a large number of samples. As a result, accurate detection of the correct retention time is even more important, due to the large amount of data that needs to be reviewed.

Tandem Mass Spectrometry or MS/MS Background

Tandem mass spectrometry or MS/MS involves ionization of one or more compounds of interest from a sample, selection of one or more precursor ions of the one or more compounds, fragmentation of the one or more precursor ions into product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are, targeted acquisition, information dependent acquisition (IDA) or data dependent acquisition (DDA), and data independent acquisition (DIA).

In a targeted acquisition method, one or more transitions of a precursor ion to a product ion are predefined for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, a mass spectrum is produced for each transition. Targeted acquisition methods include, but are not limited to, multiple reaction monitoring (MRM) and selected reaction monitoring (SRM).

In an IDA method, a user can specify criteria for performing targeted or untargeted mass analysis of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

Another exemplary IDA method is scheduled MRM (sMRM). In sMRM one or more MRM experiments are scheduled during the expected retention time of a given compound of interest.

In proteomics and many other sample types, however, the complexity and dynamic range of compounds is very large. This poses challenges for traditional targeted and IDA methods, requiring very high speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. A product ion spectrum for the entire precursor ion mass range is produced by combining the product ion spectra for each mass selection window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH™ acquisition. In a SWATH™ acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed. However, because a wider precursor ion mass selection window is used, the cycle time can be significantly reduced in comparison to the cycle time of the MS/MS$^{ALL}$ method.

SUMMARY

Systems and methods are disclosed for identifying actual XIC peaks of compounds of interest from samples so that more accurate expected retention times and more accurate expected retention time windows can be calculated.

In a first system, an actual XIC peak of a compound of interest is identified using a plurality of standard samples. The quantity of the compound of interest is known in each of the plurality of standard samples and this information is used to identify an actual XIC peak of a compound of interest.

The system includes a separation device, an ion source device, a mass spectrometer, and a processor. The separation device separates a compound of interest over time from each sample of a plurality of standard samples. The ion source device ionizes and transforms the separated compound of interest into an ion beam. The mass spectrometer mass analyzes the ion beam for at least one ion of the compound of interest, producing a plurality of intensity measurements at a plurality of different acquisition times for the at least one ion of the compound of interest for each sample of the plurality of standard samples. The mass spectrometer can perform MS producing intensity measurements for precursor ions or can perform MS/MS producing intensity measurements for product ions.

The processor calculates an XIC for at least one ion of the compound of interest for each sample of the plurality of standard samples from the plurality of intensity measurements, producing an XIC for each sample. The processor finds one or more XIC peaks in each XIC. The processor identifies an XIC peak in each XIC of each sample as an actual peak of the compound of interest, if a ratio of the intensity of the XIC peak in that sample and the intensity of another XIC peak in another sample matches a ratio of the known quantity of the compound of interest in the two samples.

In another system, an actual XIC peak of a compound of interest is identified using information about other compounds of interest in a plurality of samples. It is known that the XIC peaks of compounds of interest in the same samples have a similar distribution of retention times across those samples, and it is known that the mean of these distributions are correlated in that they differ from a known retention of their compound of interest according to a monotonic function of the acquisition time.

This system also includes a separation device, an ion source device, a mass spectrometer, and a processor. The separation device separates a plurality of compounds of interest over time from each sample of a plurality of samples. The ion source device ionizes and transforms the separated compounds of interest into an ion beam. The mass spectrometer mass analyzes the ion beam for at least one ion of each compound of interest of the plurality of compounds of interest, producing a plurality of intensity measurements at a plurality of different acquisition times for the at least one ion of each compound of interest of the plurality of compounds of interest.

The processor calculates an XIC for at least one ion of each compound of interest of the plurality of compounds of interest for each sample, producing an XIC for each ion of each compound of interest for each sample. The processor finds one or more XIC peaks in each XIC.

The processor calculates for a first XIC peak of a first compound of interest a retention time for each sample and a first distribution function that describes the distribution of the retention times of the first XIC peak across samples. The processor calculates for a second XIC peak of a second compound of interest a retention time for each sample and a second distribution function that describes the distribution of the retention times of the second XIC peak across samples.

The processor identifies the first XIC peak as an actual peak, if the first distribution function and the second distribution function have the same width and a first difference between the mean of the first distribution function and the known retention time of the first compound of interest and a second difference between the mean of the second distribution function and the known retention time of the second compound of interest are described by a monotonic function of the plurality of acquisition times.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
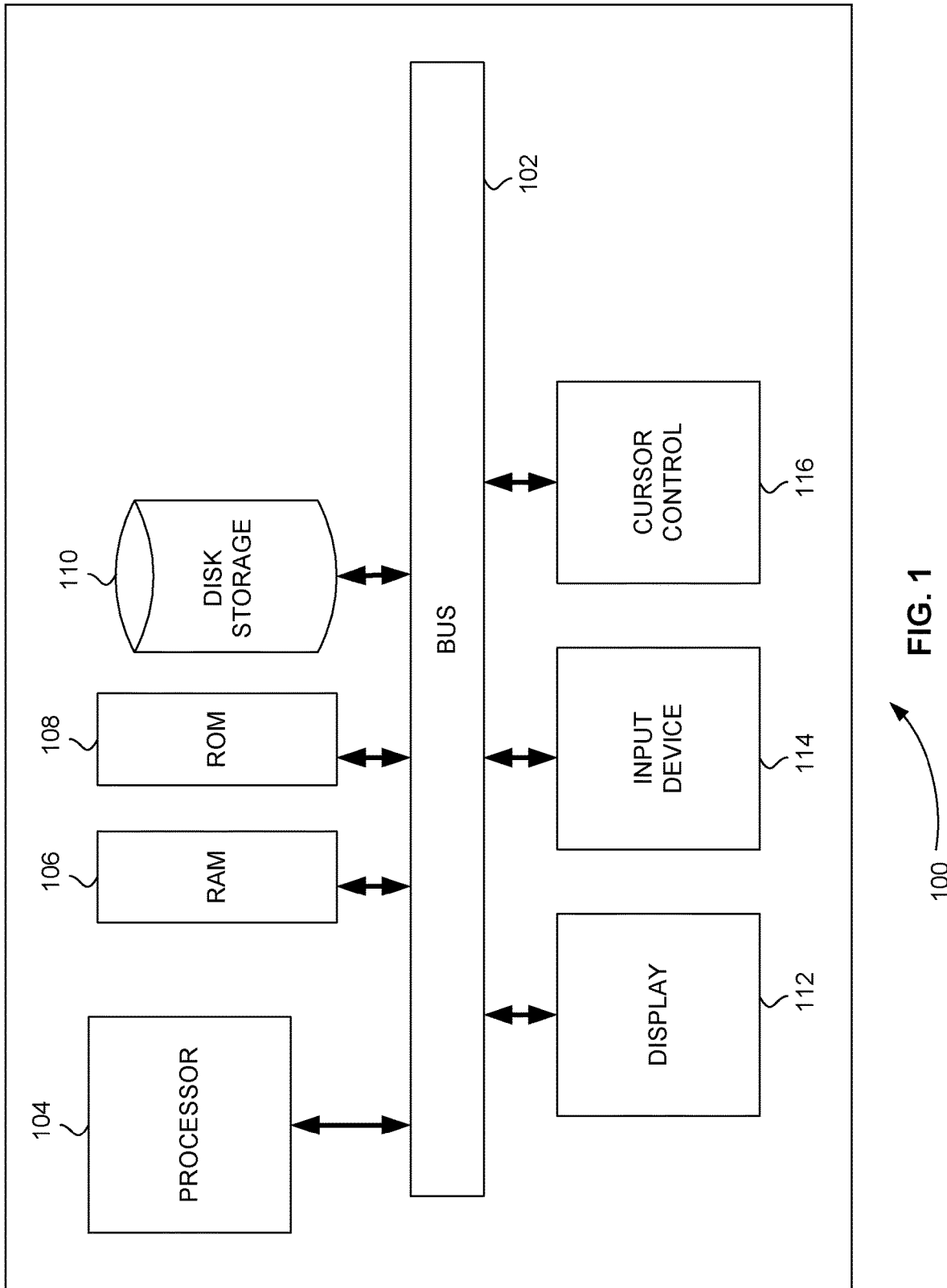
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for Identifying XIC Peaks

As described above, the combination of mass spectrometry (MS) (or tandem mass spectrometry) and liquid chromatography (LC) is an important analytical tool for the identification and quantification of compounds of interest within a mixture. The effluent exiting an LC column can be continuously subjected to mass spectrometric analysis to generate an extracted ion chromatogram (XIC), which can depict detected ion (precursor or product ion) intensity (a measure of the number of detected ions, total ion intensity or of one or more particular analytes) as a function of retention time. XIC peaks are used to identify or quantify the compounds of interest.

Unfortunately, however, there are often multiple peaks present in an XIC. In conventional methods, a peak in the XIC that is closest to an expected retention time for a compound of interest, or simply a peak exhibiting the highest intensity within the expected retention time, is selected as the peak corresponding to the compound of interest. This selection process, however, may be cumbersome, as it requires that the user specify the expected retention time for each compound of interest. Moreover, it can in some cases result in misidentification of the peak corresponding to the compound of interest.

Accordingly, there is a need for enhanced systems and methods for performing LC-MS or LC-MS/MS, and for such methods and systems that allow for a more robust, accurate, and automatic selection of a retention time window associated with a compound of interest. More particularly, systems and methods are needed to automatically distinguish XIC peaks of compounds of interest from other XIC peaks, so accurate expected retention times and expected retention time windows can be found for each compound of interest.

In various embodiments, XIC peaks of compounds of interest are distinguished from other XIC peaks using some additional information or pattern found from performing mass spectrometry experiments on a plurality of samples.

In a first embodiment, an XIC peak of a compound of interest is distinguished from other XIC peaks using the additional information provided from performing mass spectrometry experiments on a plurality of quality control (QC) or standard samples for the compound of interest. Standard samples are, for example, a set of samples with known properties, such as a known concentration or known intensity ratio. In particular, the varying known quantities of the compound of interest across the standard samples are used to distinguish XIC peaks of the compound of interest from other XIC peaks in the standard samples.

In a second embodiment, an XIC peak of a compound of interest is distinguished from other XIC peaks using the additional information provided from performing mass spectrometry experiments on a plurality of samples that include a plurality of other known compounds of interest. In particular, distributions of the retention times of the other known compounds of interest across the plurality of samples are used distinguish XIC peaks of the compound of interest from other XIC peaks in the plurality of samples.

XIC Peak Identification from Standard Samples

In a typical quantitation LC-MS or LC-MS/MS experiment, results from a sample with an unknown amount of a compound of interest are compared to results from samples with known amounts of a compound of interest. The samples with known amounts of a compound of interest are quality control (QC) or standard samples and include different known quantities of the compound of interest. In various embodiments, this information about different known quantities of the compound of interest in different standard samples is used to improve the expected retention time and expected retention time window. These different known quantities of the compound of interest appear as different XIC peak intensities in the results from the different standard samples.

Figure 2:
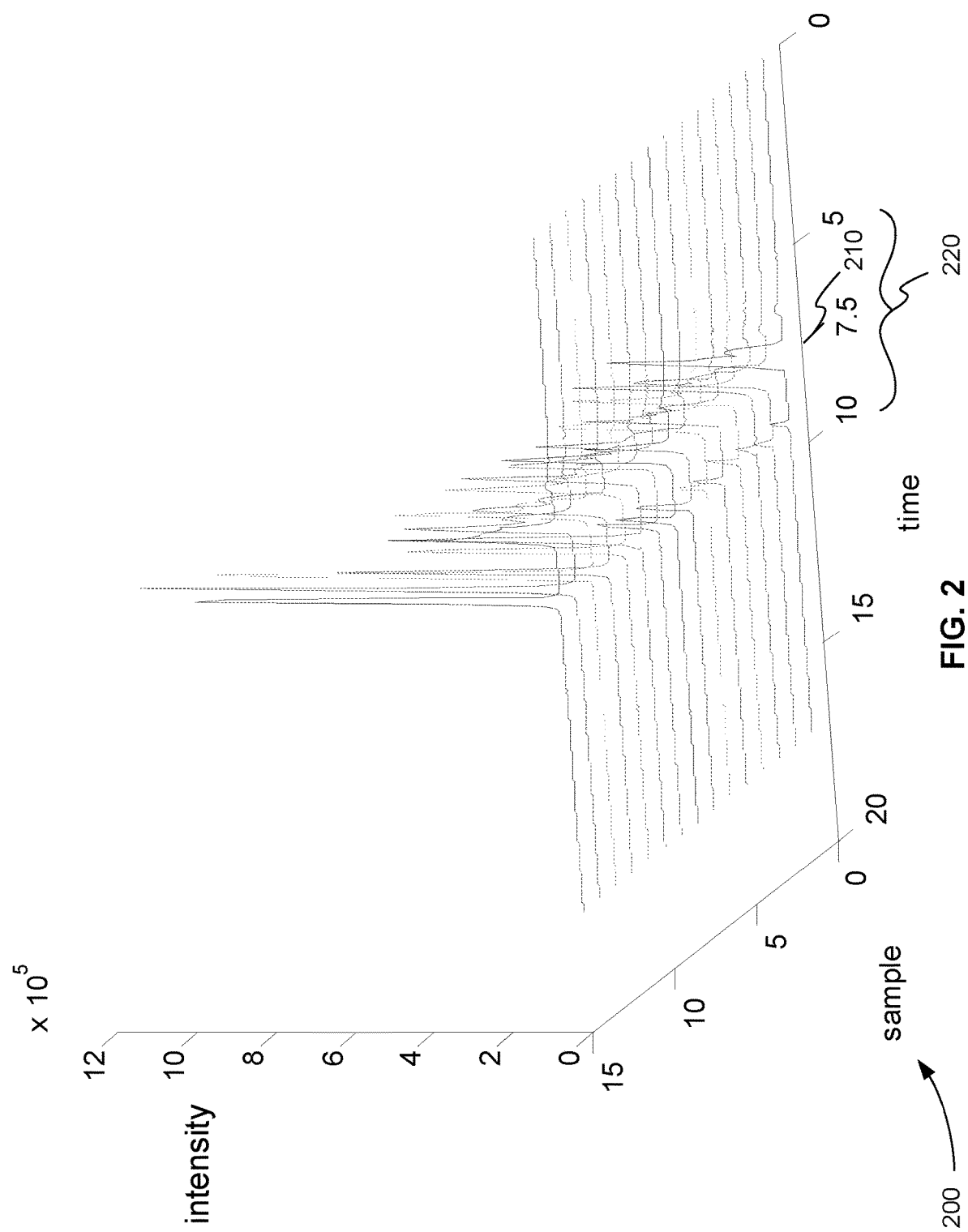
FIG. 2 is an exemplary plot of the product ion extracted ion chromatograms (XICs) calculated from results of performing liquid chromatography mass spectrometry/mass spectrometry (LC-MS/MS) analysis on 15 different standard samples for the compound Muron, in accordance with various embodiments.

FIG. 2 is an exemplary plot 200 of the product ion XICs calculated from results of performing LC-MS/MS analysis on 15 different standard samples for the compound Muron, in accordance with various embodiments. Plot 200 illustrates the problem that can be encountered when determining expected retention time and an expected retention time window from actual samples. Generally, an initial expected retention time and an initial expected retention time window are parameters entered by a user for a particular experiment. If, for example, an initial expected retention time 210 of 7.5 minutes and an initial expected retention time window 220 between 5 minutes and 10 minutes is entered by a user of the LC-MS/MS system, then a problem is encountered. Initial expected retention time window 220 includes two peaks for each sample: the actual peak and a background peak.

Generally, such discrepancies are also traditionally resolved according to a user defined parameter or option. For example, the parameter or option can be to select the peak closest to the initial expected retention time or the peak with the largest intensity. In this case, both selections would, in most samples, result in the selection of the wrong peak. For example, the peaks at initial expected retention time 210, 7.5 minutes, are the background peaks. The peaks at about 9 minutes are the actual peaks representing the compound Muron. Also, for samples 10 through 15 the actual peaks representing the compound Muron do have the larger intensities. However, for the majority of the samples, 1 through 9, the background peaks have a larger intensity.

Plot 200 shows how user defined parameters for the initial expected retention time, the initial expected retention time window, and the option for selecting peaks can lead to an incorrect result. As a result, there is a need for an automated method of calculating a new or modified expected retention time and expected retention time window from actual sample results.

Figure 3:
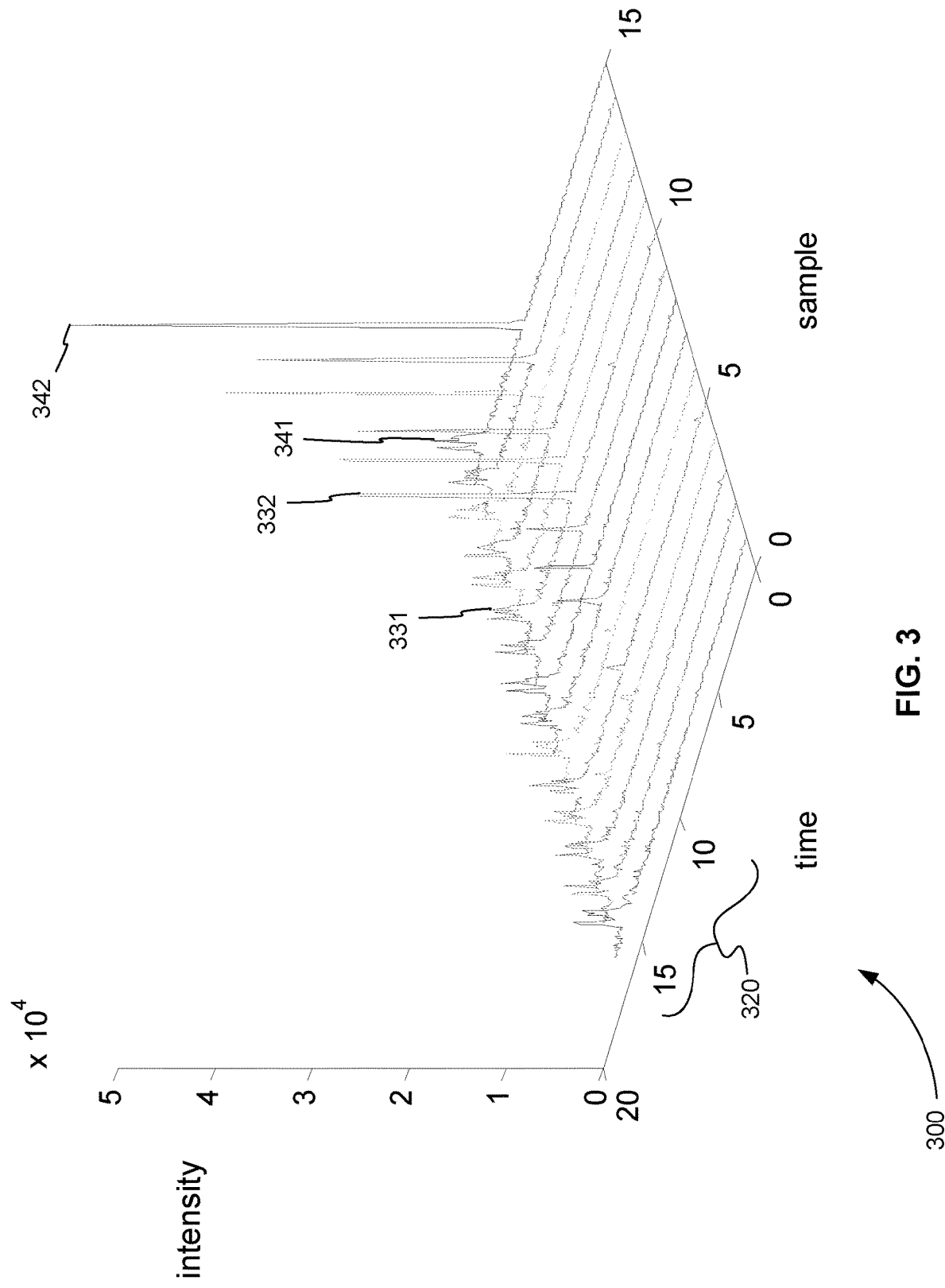
FIG. 3 is an exemplary plot of the product ion XICs calculated from the results of performing LC-MS/MS analysis on 15 different standard samples for the compound Naled, in accordance with various embodiments.

FIG. 3 is an exemplary plot 300 of the product ion XICs calculated from the results of performing LC-MS/MS analysis on 15 different standard samples for the compound Naled, in accordance with various embodiments. Plot 300 also illustrates the problem that can be encountered when determining expected retention time and an expected retention time window from actual samples. In plot 300, an initial expected retention time window 320 includes actual peaks of Naled at about 11 minutes and background peaks at about 16 minutes. The distance between the actual peaks and background peaks of Naled is larger than it is for Muron in FIG. 2, but the peaks are still close enough to introduce an ambiguity depending on the size of the initial expected retention time window selected. In addition, FIG. 3 shows another problem that can occur. Some samples may contain no peaks for the compound of interest. For example, samples 1 and 3 of plot 300 have no peaks for Naled. These samples, however, still include peaks of the background.

Plot 300 also, however, illustrates the solution to this problem. Note that the actual peaks of Naled at a retention time of about 11 minutes vary in intensity across samples. This intensity variation or intensity pattern is also known, since the samples are standard samples and the quantity of Naled in a standard sample is known. In contrast, the background peaks at a retention time of about 16 minutes do not significantly vary in intensity across samples or do not vary according the known quantity of Naled in the sample.

As a result, in various embodiments, an actual peak of a compound of interest is found in a standard sample by comparing the intensity of that peak to the intensity of at least one other peak in another standard sample. If the intensity ratio of the two peaks is found to match the ratio of the quantities of the compound of interest in the two different standard samples, then both peaks are found to be actual peaks of the compound of interest.

This intensity ratio comparison is also illustrated in plot 300. For example, sample 10 includes background peak 331 and actual peak 332, and sample 15 includes background peak 341 and actual peak 342. The ratio of the quantities of Naled in sample 15 as compared to sample 10 is known to be 2, or sample 15 has twice as much Naled as sample 10. This is the additional information that is known from the standard samples. When the intensity of actual peak 342 of sample 15 is compared to the intensity of actual peak 332 of sample 10, the ratio of the two intensities is also found to be 2, matching the ratio of Naled in the two samples. As a result, actual peak 342 of sample 15 and actual peak 332 of sample 10 are found to be peaks of the compound of interest Naled.

In contrast, if the intensity of background peak 341 of sample 15 is compared to the intensity of background peak 331 of sample 10, the ratio is found to be closer to 1, which does not match the ratio of Naled in the two samples. As a result, neither background peak 341 of sample 15 nor background peak 331 of sample 10 can be confirmed as actual Naled peaks.

Similarly, if the intensity of actual peak 342 of sample 15 is compared to the intensity of background peak 331 of sample 10, the ratio is found to be much greater than 2, which does not match the ratio of Naled in the two samples. As a result, neither actual peak 342 of sample 15 nor background peak 331 of sample 10 can be confirmed as actual Naled peaks through this comparison, even though actual peak 342 of sample 15 is a Naled peak.

Once one or more actual peaks of the standard samples are found, the expected retention time and the expected retention time are modified based on these peaks.

For example, in one embodiment, the smallest retention time shift between any two standard samples that provides the intensity pattern of at least one matching peak across samples that matches expected intensity pattern is found. Those peaks are then identified as target peaks and their retention time and retention shift across samples (acquisition times) are used to predict the retention time of the compound of interest in the unknown samples.

In various embodiments, by statistical analysis and modeling of the retention time shift, the expected retention time window is also determined as well as the uncertainty of the solution. The uncertainty measure is used to bring problematic cases to the user's attention and to ask for assistance in order to reduce errors in the final results and also to reduce the time needed for review or correction, for example.

Such embodiments utilize known information or features of a subset of samples. In various embodiments, this information can also be combined with measured ion ratios of all peaks, in case of multiple fragments per compound of interest.

In another embodiment, a matrix of all possible combinations of peaks between two samples is created to find a new or modified expected retention time from the standard samples.

In various embodiments, the new or modified expected retention time is, therefore, found from all samples or just a subset of samples. Similarly, the new or modified expected retention time window is calculated from the distribution of retention times across all samples or just a subset of samples. For example, a histogram of retention times or shifts from the expected retention time can be created across all samples or just a subset of samples. The width of the distribution of the histogram or some multiple of the width of the distribution can be used to provide the new or modified expected retention time window.

Figure 4:
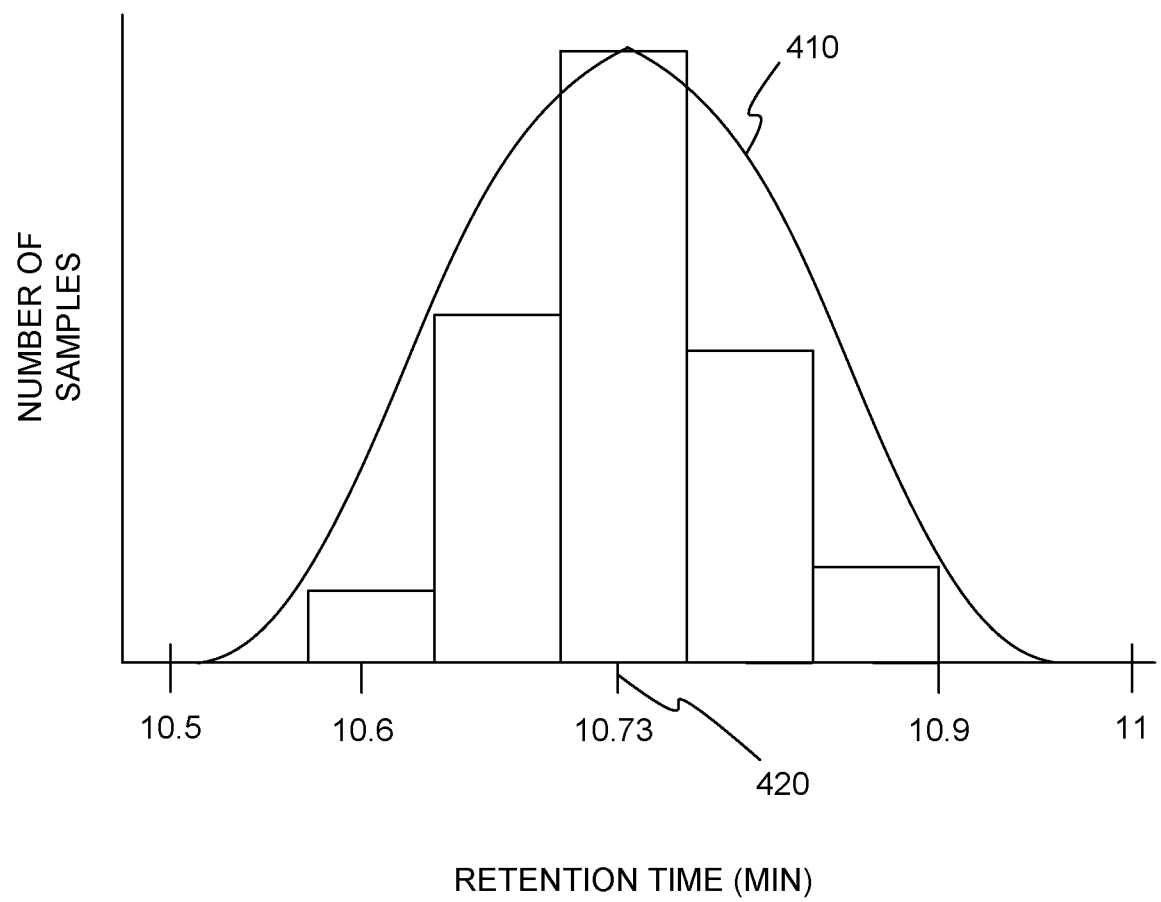
FIG. 4 is a plot of a histogram of the actual retention times found for the actual peaks of the compound Naled across the 15 standard samples, in accordance with various embodiments.
Figure 4:
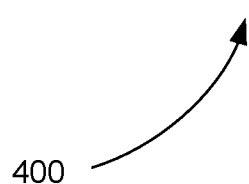

FIG. 4 is a plot 400 of a histogram of the actual retention times found for the actual peaks of the compound Naled across the 15 standard samples, in accordance with various embodiments. The actual peaks of Naled ions are found by comparing the peak intensities of peaks in different samples and then comparing the intensity ratio of two peaks to the ratio of the quantities of Naled known to be in the two different samples, as described above.

The histogram of plot 400 is plotted by counting the number of samples that have an actual peak with a retention within one of five different retention time ranges. The histogram of plot 400 has a Gaussian distribution or shape 410 and a mean retention time 420 of about 10.73 minutes. If the original expected retention time of Naled is 10.5 minutes, the histogram shows that the retention is shifted about 0.23 minutes in the standard samples. The new or modified expected retention time is then 10.73 minutes.

The width of the Gaussian distribution, between 10.5 and 11 minutes, can be selected as the new or modified expected retention time window. Alternatively, a multiple, such as three times the 0.5 minute range, can be used. For example, the new or modified expected retention time window can be from 10 to 11.5 minutes.

Figure 5:
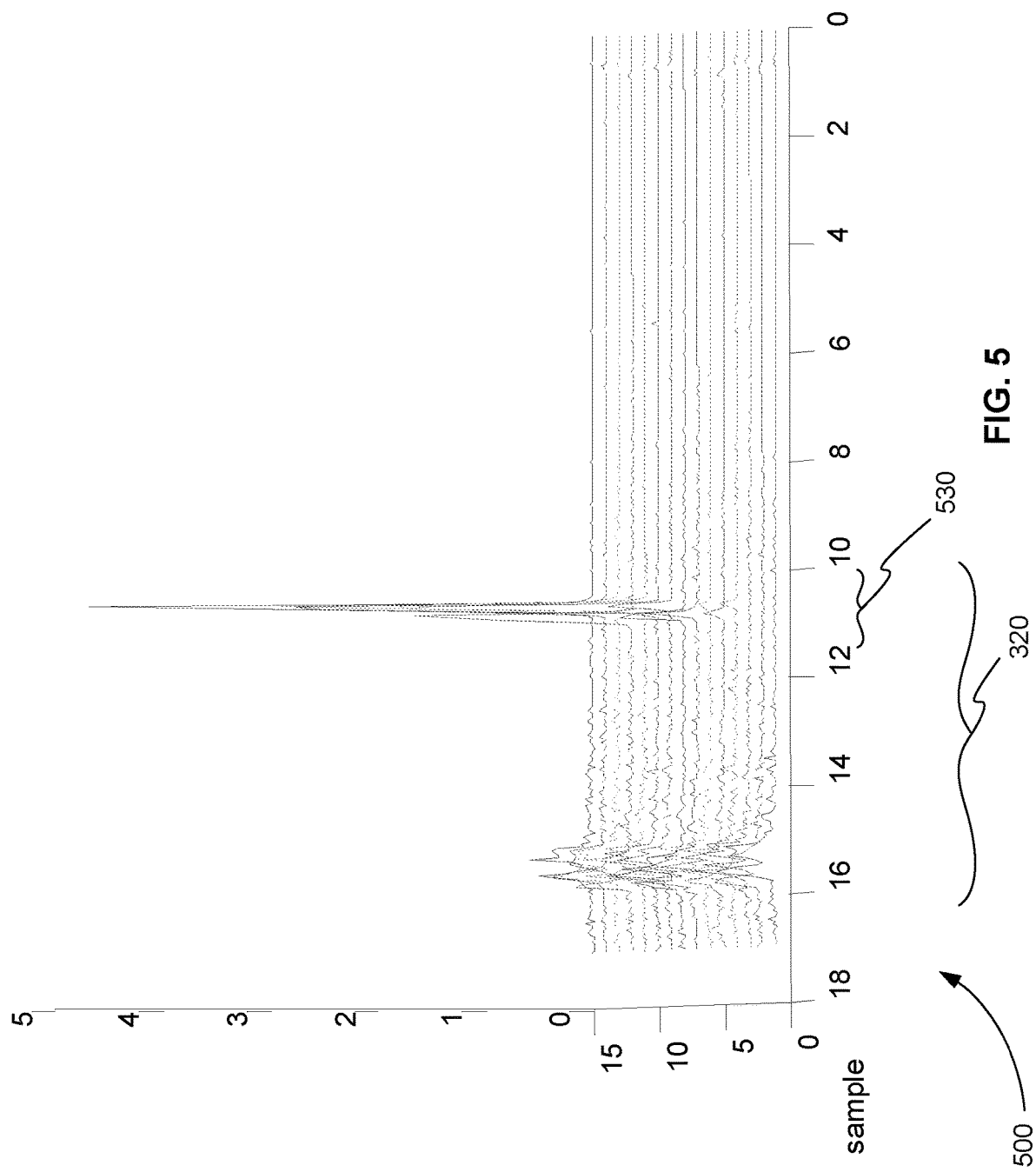
FIG. 5 is a different view of the XICs of FIG. 3 that are calculated from the results of performing LC-MS/MS analysis on 15 different standard samples for the compound Naled, in accordance with various embodiments.

FIG. 5 is a different view 500 of the XICs of FIG. 3 that are calculated from the results of performing LC-MS/MS analysis on 15 different standard samples for the compound Naled, in accordance with various embodiments. View 500 shows the original expected retention time window 320 that include the actual peaks and the background peaks. View 500 also shows a new or modified expected retention time window 530 from 10 to 11.5 minutes that is determined from the histogram of FIG. 4, for example.

FIG. 5 shows how the expected retention time window is significantly improved in going from window 320 to window 530. New or modified expected retention time window 530 is now large enough to find a Naled ion peak in a sample where the quantity is unknown, but is small enough to avoid detecting the background peaks.

XIC Peak Identification from Samples with Other Compounds of Interest

For some samples, standards may not be available. As a result, some other additional information is needed to distinguish actual XIC peaks from background peaks.

In various embodiments, the fact that all compounds of interest in a plurality of samples have a similar Gaussian distribution of actual retention times across the plurality of samples is the additional information that is used to distinguish actual XIC peaks of a compound of interest from background peaks. Generally, all compounds of interest have an expected retention time. When the distributions of the actual retention times of the compounds of interest are plotted across samples, they are all found to have a similar Gaussian distribution. In addition, the shift of the mean of the Gaussian distribution from the expected retention time for each compound of interest is substantially the same.

In particular, a peak of a compound of interest is found in a plurality of samples by calculating the distribution of the retention time of the peak across the plurality of samples and then comparing the distribution to one or more distributions of the retention times of peaks of other compounds of interest across the same plurality of samples. A peak of a compound of interest is found if the distribution of the retention time of the peak across the plurality of samples matches a distribution of the retention time of a peak of at least one different compound of interest across the plurality of samples in both its shape and in the amount its mean is shifted or differs from the expected retention time.

Figure 6:
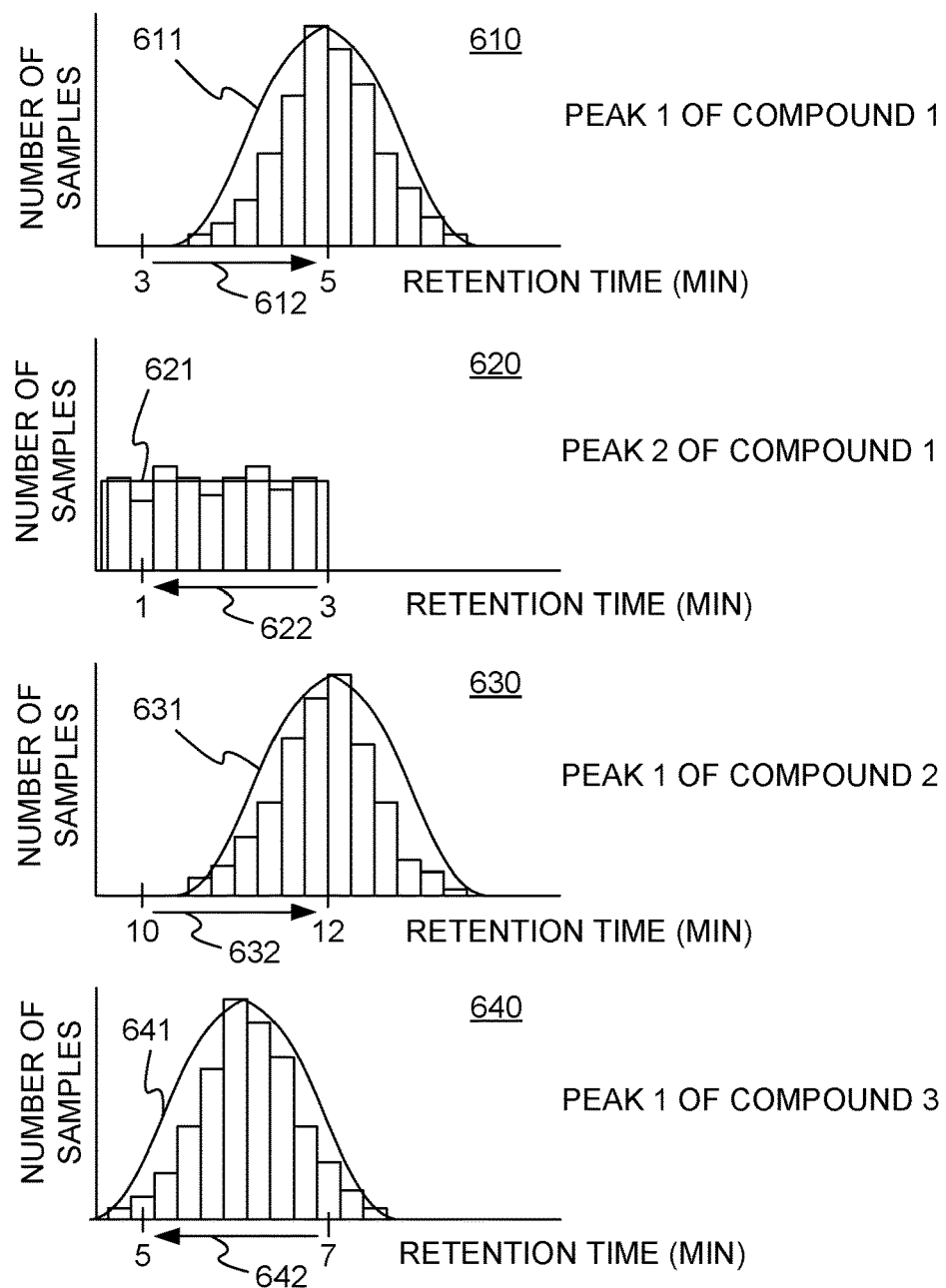
FIG. 6 is a series of plots of the distribution of retention times of particular XIC peaks of compounds of interest across a plurality of samples, in accordance with various embodiments.

FIG. 6 is a series 600 of plots of the distribution of retention times of particular XIC peaks of compounds of interest across a plurality of samples, in accordance with various embodiments. Plot 610 shows a distribution 611 of the retention times of ion peak 1 of compound 1 across a plurality of samples. Peak 1 is one of the peaks found in the XICs calculated for compound 1 for each of the plurality of samples. An XIC is calculated based on the known m/z of an ion of the known compound. The distribution 611 is found, for example, by plotting a histogram of the number of samples that include ion peak 1 at each retention time or retention time range. If the original expected retention time of compound 1 is 3 minutes, then distribution 611 shows a 2 minute shift 612 of the retention time. In other words, the mean of distribution 611 has a shift 612 of 2 minutes from the original expected retention time of 3 minutes.

In various embodiments, it is determined if peak 1 is an actual peak, by comparing distribution 611 and shift 612 to the distribution and shift of an ion peak of a different known compound of interest in the plurality of samples. For example, plot 630 shows a distribution 631 of the retention times of ion peak 1 of compound 2 across the plurality of samples. The mean of distribution 631 is also shifted from the original expected retention time of 10 minutes by a shift 632 of 2 minutes.

On comparing plots 610 and 630, distribution 611 and distribution 631 both have the shape of a Gaussian distribution. Actual peaks are known to have retention times that follow a Gaussian distribution across samples. Distribution 611 and distribution 631 have similar widths, so they are likely similar distributions. Finally, shift 612 of distribution 11 and shift 632 of distribution 631 have the same magnitude and direction. As a result, peak 1 of compound 1 is found to be an actual peak of compound 1 and not a background peak.

In various embodiments, the retention time distribution of an ion peak of compound of interest is compared to the retention time distributions of ion peaks of more than one different compound of interest. In general, if a large number of different compounds of interest, such as 1,000 or more, are available, the vast majority of ion peaks found for these compounds can be assumed to be actual peaks of the compound of interest. In other words, the largest peak found in an XIC or the peak closest to the expected retention time usually is the actual peak. However, in some cases, the peak found can be a background peak or an incorrect interfering peak. As a result, comparing the retention time distribution of an ion peak of compound of interest to the retention time distributions of ion peaks of more than one different compound of interest improves the certainty of the comparison.

For example, plot 640 shows a distribution 641 of the retention times of ion peak 1 of compound 3 across the plurality of samples. The mean of distribution 641 is also shifted from the original expected retention time of 10 minutes by a shift 642 of 2 minutes. However, the direction of shift 642 is incorrect. This means that peak 1 of compound 3 is actually an incorrect peak. If distribution 611 of peak 1 of compound 1 in plot 610 is compared to distribution 641 of peak 1 of compound 3 in plot 630, peak 1 of compound 1 will not be found to be an actual peak, which is an incorrect result. As a result, comparing the retention time distribution 611 of peak 1 of compound 1 to other distributions can improve the certainty in determining whether or not peak 1 of compound 1 is an actual peak.

Compound 1 can also include a background peak. Plot 620 shows a distribution 621 of the retention times of ion peak 2 of compound 1 across the plurality of samples. Peak 2 of compound 1 is a background peak. A true negative result can be found by comparing plots 620 and 630. Distribution 621 has the shape of a uniform distribution, while distribution 631 has the shape of a Gaussian distribution. Shift 622 of peak 2 of compound 1 has the same magnitude of shift 632 of peak 1 of compound 2. However, shift 622 and 632 differ in direction. This comparison shows that peak 2 of compound 1 is not an actual peak of compound 1.

In various embodiments, this method of identifying the actual ion peak of compound of interest using ion peaks of other compounds of interest is used in scheduled multiple reaction monitoring (sMRM). sMRM typically involves monitoring of large number of compounds of interest over relatively short time windows so that the number of peak features for XIC alignment are not sufficient for standard alignment approaches that utilize a larger number of matching reference peaks. For example, it is common to have one or two peaks observed in an XIC across multiple samples. Relating single-peak samples with two-peak samples introduces uncertainty. It is reasonable to expect that uncertain cases produce random patterns of retention time shift due to the random error of retention time detection. In contrast, compounds of interest with mostly correctly identified retention times show a similar pattern across the acquisition time (retention time shifts tend to be correlated, not necessarily identical, also the amount of shifting is a monotonic function of the acquisition time).

System for Identifying an Actual XIC Peak Using Standard Samples

Figure 7:
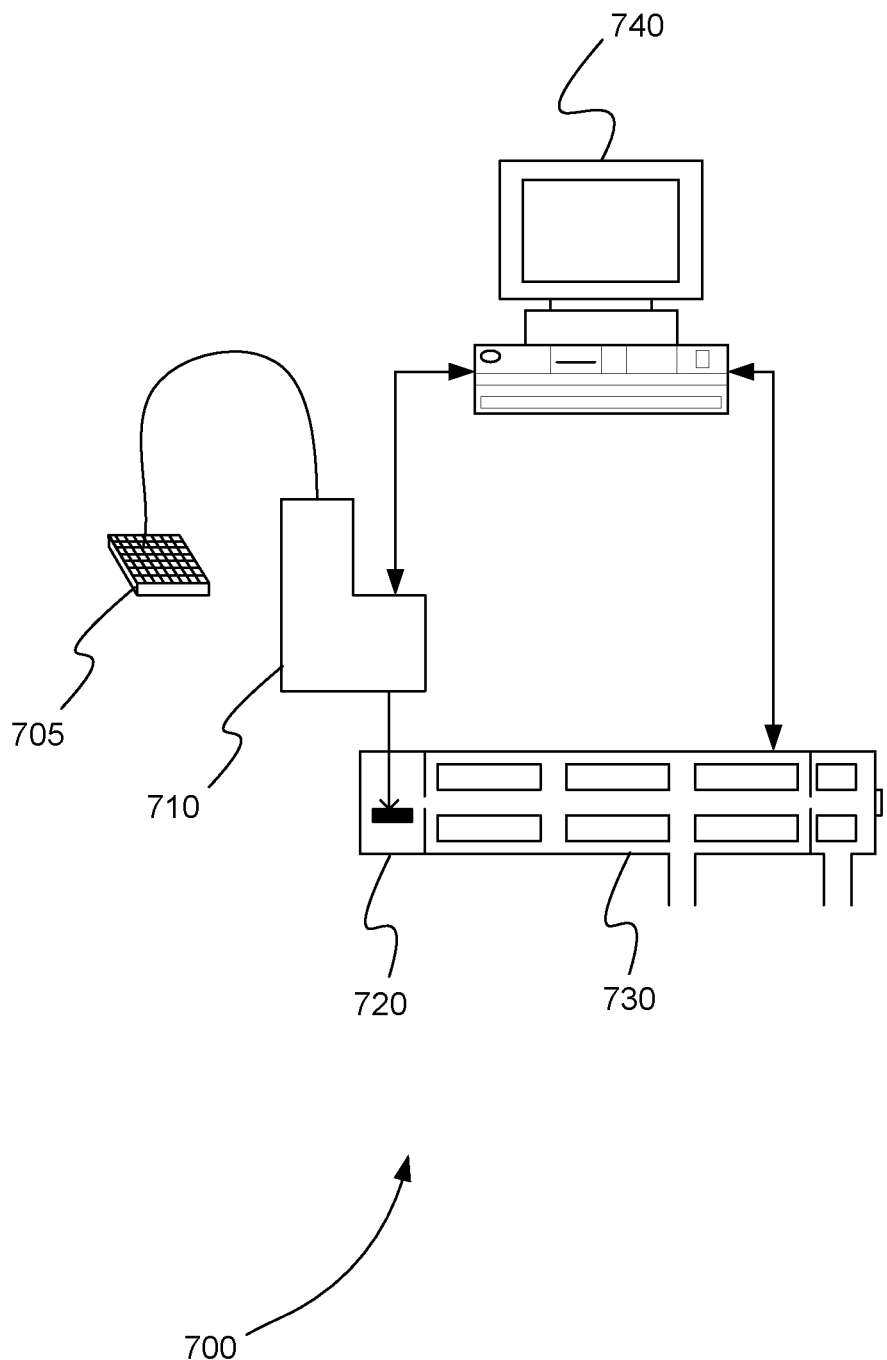
FIG. 7 is a schematic diagram showing a system for identifying an XIC peak of a compound of interest, in accordance with various embodiments.

FIG. 7 is a schematic diagram 700 showing a system for identifying an XIC peak of a compound of interest, in accordance with various embodiments. The XIC peak is found, in various embodiments, using a plurality of standard samples. The system of FIG. 7 includes separation device 710, ion source device 720, mass spectrometer 730, and processor 740.

Separation device 710 separates a compound of interest over time from each sample of a plurality of standard samples. Each sample of the plurality of standard samples includes a different known quantity of the compound of interest. Each sample is obtained from sample plate 705, for example. Separation device 710 can perform separation techniques that include, but are not limited to, liquid chromatography, gas chromatography, capillary electrophoresis, or ion mobility.

Ion source device 720 ionizes and transforms the separated compound of interest for each sample of the plurality of standard samples into an ion beam. Ion source device 720 can perform ionization techniques that include, but are not limited to, matrix assisted laser desorption/ionization (MALDI) or electrospray ionization (ESI).

Mass spectrometer 730 receives the ion beam for each sample of the plurality of standard samples. Mass spectrometer 730 mass analyzes the ion beam for at least one ion of the compound of interest. A plurality of intensity measurements at a plurality of different acquisition times are produced for the at least one ion of the compound of interest for each sample of the plurality of standard samples.

In the system of FIG. 7, mass spectrometer 730 is shown as a triple quadrupole device. One of ordinary skill in the art can appreciate that any of mass spectrometer 730 can include other types of mass spectrometry devices including, but not limited to, ion traps, orbitraps, time-of-flight (TOF) devices, ion mobility devices, or Fourier transform ion cyclotron resonance (FT-ICR) devices.

In various embodiments, mass spectrometer 730 can mass filter or select a precursor ion of the compound of interest by selecting its mass-to-charge ratio at each acquisition time of the plurality of different acquisition times. Mass spectrometer 730 can then measure the intensity of the precursor ion at each acquisition time of the plurality of different acquisition times. In other words, the system of FIG. 7 can perform LC-MS, for example.

In various embodiments, mass spectrometer 730 can mass filter or select a precursor ion of the compound of interest by selecting its mass-to-charge ratio at each acquisition time of the plurality of different acquisition times. Mass spectrometer 730 can then fragment the precursor ion into one or more product ions. Finally, mass spectrometer 730 can then measure the intensity of at least one product ion of the compound of interest at each acquisition time of the plurality of different acquisition times. In other words, the system of FIG. 7 can perform LC-MS/MS, for example.

Processor 740 can be, but is not limited to, a computer, a microprocessor, the computer system of FIG. 1, or any device capable of sending and receiving control signals and data from mass spectrometer 730 and processing data. Processor 740 is in communication with ion separation device 720, ion source device 720, and mass spectrometer 730.

Processor 740 receives the plurality of intensity measurements for the at least one ion of the compound of interest for each sample of the plurality of standard samples from mass spectrometer 730. Processor 740 calculates an XIC for the at least one ion of the compound of interest for each sample of the plurality of standard samples from the plurality of intensity measurements. An XIC is produced for each sample of the plurality of standard samples.

Processor 740 finds one or more XIC peaks in each XIC of each sample of the plurality of standard samples. Processor 740 can, for example, use any conventional peak finding algorithm.

Processor 740 identifies an XIC peak of the one or more XIC peaks in each XIC of each sample of the plurality of standard samples as an actual peak of the compound of interest, if a ratio of the intensity of the XIC peak in each sample and the intensity of another XIC peak in another sample matches a ratio of the known quantity of the compound of interest in each sample and the known quantity of the compound of interest in another sample. In other words, processor 740 compares the ratio of XIC peak intensities in different samples to the ratio of known quantities of the compound of interest in the different samples to identify the XIC peak.

In various embodiments, processor 740 identifies an XIC peak in two or more samples of the plurality of standard samples as an actual peak of the compound of interest and calculates a retention time for each XIC peak identified as an actual peak of the compound of interest. A retention time is produced for each of the two or more samples of the plurality of standard samples.

In various embodiments, processor 740 calculates a distribution function for the distribution of retention times among the two or more samples of the plurality of standard samples using the retention times calculated for each of the two or more samples of the plurality of standard samples. For example, FIG. 4 shows a distribution function 410 calculated for the distribution of retention times among two or more samples of the plurality of standard samples using the retention times calculated for each of the two or more samples of the plurality of standard samples.

In various embodiments, processor 740 of FIG. 7 calculates an expected retention time and an expected retention time window from the distribution function. For example, processor 740 calculates an expected retention time as the expected value of the distribution function. The expected value of the distribution function can be estimated using various statistical methods for distribution parameter estimation.

In various embodiments, the expected value can include the mean and/or the median. Both can be used if the distribution is binomial (double hump) or just one can be used if the distribution has a single hump, like in a Gaussian distribution.

In various embodiments, the expected value can be found from a hypothesis test that distribution has an expected value equal to average value calculated from observation. If the test fails, then the distribution is not Gaussian-like and other modeling techniques can be applied. In practice, for single batch, it is most likely Gaussian and if it is not Gaussian, then it is sign of chromatographic system property change. A sign of chromatographic system property change can be used for signaling issue, or to automatically adjust scheduling windows and other dependent parameters of the acquisition in order to make sure all samples will have useful measurements (will not cut-off the peak of interest due to inappropriate scheduling window).

FIG. 4 shows an exemplary mean 420 calculated from the distribution function 410 that can be used as a new or modified expected retention time.

In various embodiments, processor 740 of FIG. 7 calculates the width of the expected retention time window as the width of the distribution function or as a multiple of the width of the distribution function. FIG. 4 shows an exemplary distribution function 410 with a width of about 0.5 min. This width or a multiple of this width can be used as a new or modified expected retention time window.

System for Identifying an Actual XIC Peak Using Other Compounds of Interest

As described above, for some samples standards may not be available. As a result, some other additional information is needed to distinguish actual XIC peaks from background peaks.

Returning to FIG. 7, the same system can be used to identify an extracted ion chromatogram (XIC) peak of a compound of interest using a plurality of samples that include a plurality of other compounds of interest.

Separation device 710 separates a plurality of compounds of interest over time from each sample of a plurality of samples. Ion source device 720 ionizes and transforms the separating compounds of interest of the plurality of compounds of interest for each sample of the plurality of samples into an ion beam.

Mass spectrometer 730 receives the ion beam for each sample of the plurality of samples. Mass spectrometer 730 mass analyzes the ion beam for at least one ion of each compound of interest of the plurality of compounds of interest. A plurality of intensity measurements at a plurality of different acquisition times are produced for the at least one ion of each compound of interest of the plurality of compounds of interest for each sample of the plurality of samples.

Processor 740 receives the plurality of intensity measurements for the at least one ion of each compound of interest of the plurality of compounds of interest for each sample of the plurality of sample from mass spectrometer 730. Processor 740 also receives a known retention time for each compound of interest of the plurality of compounds of interest from a user, for example.

Processor 740 calculates an XIC for the at least one ion of each compound of interest of the plurality of compounds of interest for each sample of the plurality of samples from the plurality of intensity measurements. An XIC is produced for the at least one ion of each compound of interest of the plurality of compounds of interest for each sample of the plurality of samples. Processor 740 finds one or more XIC peaks in each XIC for the at least one ion of each compound of interest of the plurality of compounds of interest for each sample of the plurality of samples.

Processor 740 calculates for a first XIC peak of an ion of a first compound of interest of the plurality of compounds of interest a retention time for each sample of the plurality of samples and a first distribution function that describes the distribution of the retention times of the first XIC peak across the plurality of samples. Plot 610 of FIG. 6 shows an exemplary first distribution function 611 for the retention times of a first XIC peak across a plurality of samples.

Processor 740 of FIG. 7 calculates for a second XIC peak of an ion of a first compound of interest of the plurality of compounds of interest a retention time for each sample of the plurality of samples and a second distribution function that describes the distribution of the retention times of the second XIC peak across the plurality of samples. Plot 630 of FIG. 6 shows an exemplary second distribution function 631 for the retention times of a second XIC peak across a plurality of samples.

Finally, processor 740 of FIG. 7 identifies the first XIC peak as an actual peak of the first compound of interest, if the first distribution function and the second distribution function have the same width and a first difference between the mean of the first distribution function and the known retention time of the first compound of interest and a second difference between the mean of the second distribution function and the known retention time of the second compound of interest are described by a monotonic function of the plurality of acquisition times.

Exemplary first distribution function 611 of plot 610 of FIG. 6 and exemplary second distribution function 631 of plot 630 of FIG. 6 have the same width. Exemplary first distribution function 611 has a first difference 612 between the mean of first distribution function 611 and the known retention time of the first compound of interest. Exemplary second distribution function 631 has a second difference 632 between the mean of second distribution function 631 and the known retention time of the second compound of interest. First difference 612 and second difference 632 are described by a monotonic function of the plurality of acquisition times. In fact, first difference 612 and second difference 632 are both 2 minutes. A monotonic function is a function that is non-increasing or non-decreasing. As a result, the first XIC peak of a first compound of interest that has first distribution function 611 can be identified as an actual peak using the second distribution function 631 of a second XIC peak of a second compound of interest.

In various embodiments, an XIC peak can be identified by comparing its distribution to more than one distribution of other XIC peaks of other compounds of interest. For example, processor 740 of FIG. 7 can further calculate for one or more other XIC peaks of ions of one or more other compounds of interest of the plurality of compounds of interest a retention time for each sample of the plurality of samples and a distribution function that describes the distribution of the retention times of the one or more other XIC peaks across the plurality of samples. Processor 740 can then identify the first XIC peak as an actual peak of the first compound of interest, if the first distribution function and the distribution functions of the one or more other XIC peaks have the same width and a first difference between the mean of the first distribution function and the known retention time of the first compound of interest and the differences between the means of the distribution functions of the one or more other XIC peaks and the known retention times of the one or more other compounds of interest are described by a monotonic function of the plurality of acquisition times.

In various embodiments, processor 740 calculates an expected retention time and an expected retention time window from the first distribution function. For example, processor 740 calculates an expected retention time as the mean of the first distribution function. Processor 740 can calculate the width of the expected retention time window as the width of the first distribution function or as a multiple of the width of the first distribution function.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for identifying an extracted ion chromatogram (XIC) peak of a compound of interest using a plurality of samples that include a plurality of other compounds of interest, comprising:
- a separation device that separates a plurality of compounds of interest over time from each sample of a plurality of samples;
- an ion source device that ionizes and transforms the separated compounds of interest of the plurality of compounds of interest for each sample of the plurality of samples into an ion beam;
- a mass spectrometer receives the ion beam for each sample of the plurality of samples and mass analyzes the ion beam for at least one ion of each compound of interest of the plurality of compounds of interest, producing a plurality of intensity measurements at a plurality of different acquisition times for the at least one ion of each compound of interest of the plurality of compounds of interest for each sample of the plurality of samples;
- a processor in communication with the mass spectrometer that
  - receives the plurality of intensity measurements for the at least one ion of each compound of interest of the plurality of compounds of interest for each sample of the plurality of sample from the mass spectrometer and a known retention time for each compound of interest of the plurality of compounds of interest from a user,
  - calculates an XIC for the at least one ion of each compound of interest of the plurality of compounds of interest for each sample of the plurality of samples from the plurality of intensity measurements, producing an XIC for the at least one ion of each compound of interest of the plurality of compounds of interest for each sample of the plurality of samples,
  - finds one or more XIC peaks in each XIC for the at least one ion of each compound of interest of the plurality of compounds of interest for each sample of the plurality of samples,
  - calculates for a first XIC peak of an ion of a first compound of interest of the plurality of compounds of interest a retention time for each sample of the plurality of samples and a first distribution function that describes the distribution of the retention times of the first XIC peak across the plurality of samples,
  - calculates for a second XIC peak of an ion of a first compound of interest of the plurality of compounds of interest a retention time for each sample of the plurality of samples and a second distribution function that describes the distribution of the retention times of the second XIC peak across the plurality of samples, and
  - identifies the first XIC peak as an actual peak of the first compound of interest, if the first distribution function and the second distribution function have the same width and a first difference between the mean of the first distribution function and the known retention time of the first compound of interest and a second difference between the mean of the second distribution function and the known retention time of the second compound of interest are described by a monotonic function of the plurality of acquisition times.

2. The system of claim 1, wherein the processor
- calculates for one or more other XIC peaks of ions of one or more other compounds of interest of the plurality of compounds of interest a retention time for each sample of the plurality of samples and a distribution function that describes the distribution of the retention times of the one or more other XIC peaks across the plurality of samples and
- identifies the first XIC peak as an actual peak of the first compound of interest, if the first distribution function and the distribution functions of the one or more other XIC peaks have the same width and a first difference between the mean of the first distribution function and the known retention time of the first compound of interest and the differences between the means of the distribution functions of the one or more other XIC peaks and the known retention times of the one or more other compounds of interest are described by a monotonic function of the plurality of acquisition times.

3. The system of claim 1, wherein the processor calculates an expected retention time and an expected retention time window from the first distribution function.

4. The system of claim 3, wherein the processor calculates an expected retention time as the mean of the first distribution function.

5. The system of claim 3, wherein the processor calculates the width of the expected retention time window as the width of the first distribution function.

6. The system of claim 3, wherein the processor calculates the width of the expected retention time window as a multiple of the width of the first distribution function.

* * * * *